Figure 1:
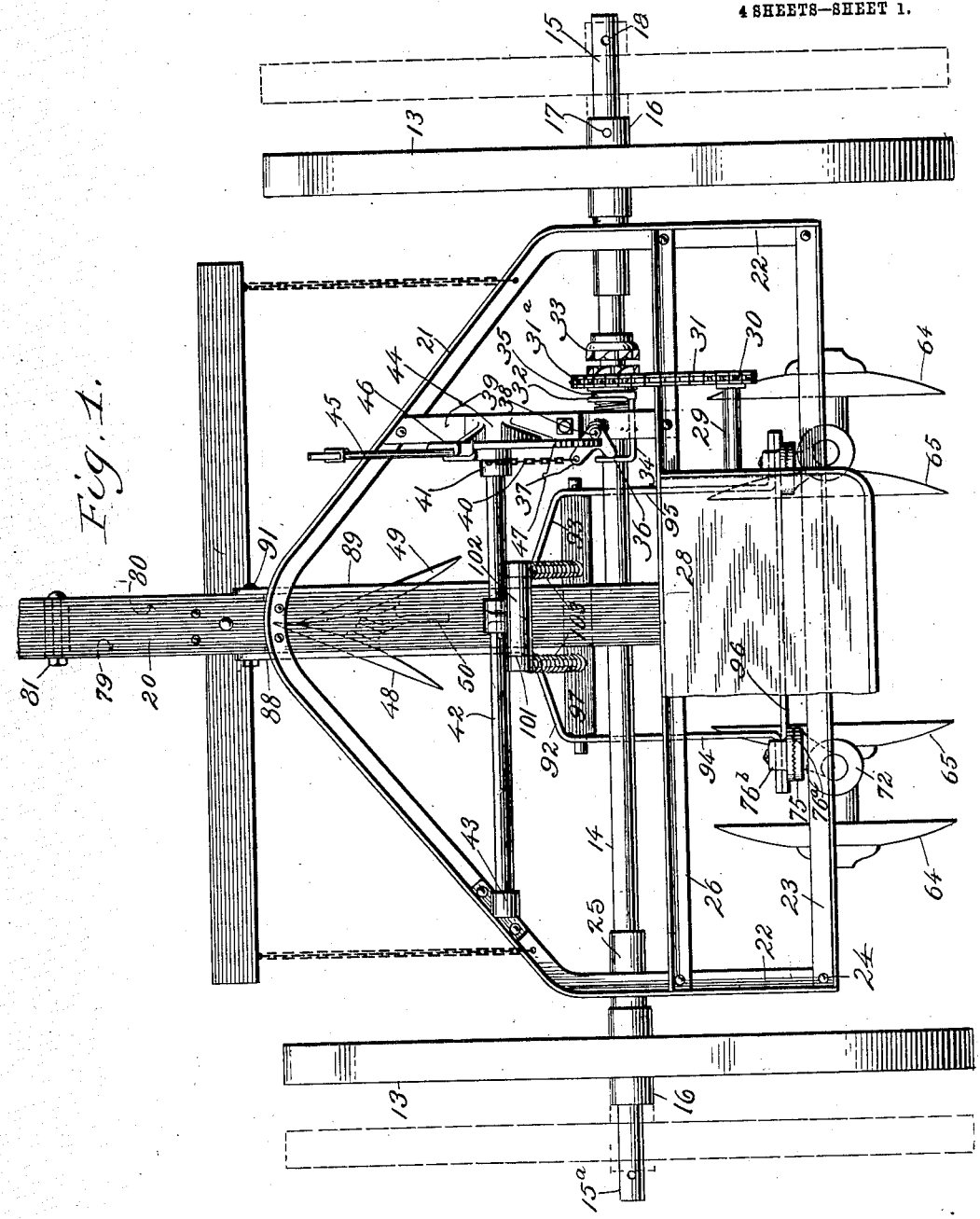

No. 860,399. PATENTED JULY 16, 1907.
W. C. LYNHAM & W. D. CREWS.
COMBINED FURROW OPENER, FERTILIZER DISTRIBUTER, LISTER,
AND BEDDER.
APPLICATION FILED JULY 20, 1906.

4 SHEETS—SHEET 1.

Witnesses
Inventors
William C Lynham
William D. Crews
By Meyers Cushwa & Rex
their Attorneys No. 860,399. PATENTED JULY 16, 1907.
W. C. LYNHAM & W. D. CREWS.
COMBINED FURROW OPENER, FERTILIZER DISTRIBUTER, LISTER, AND BEDDER.
APPLICATION FILED JULY 20, 1906.
4 SHEETS—SHEET 2.
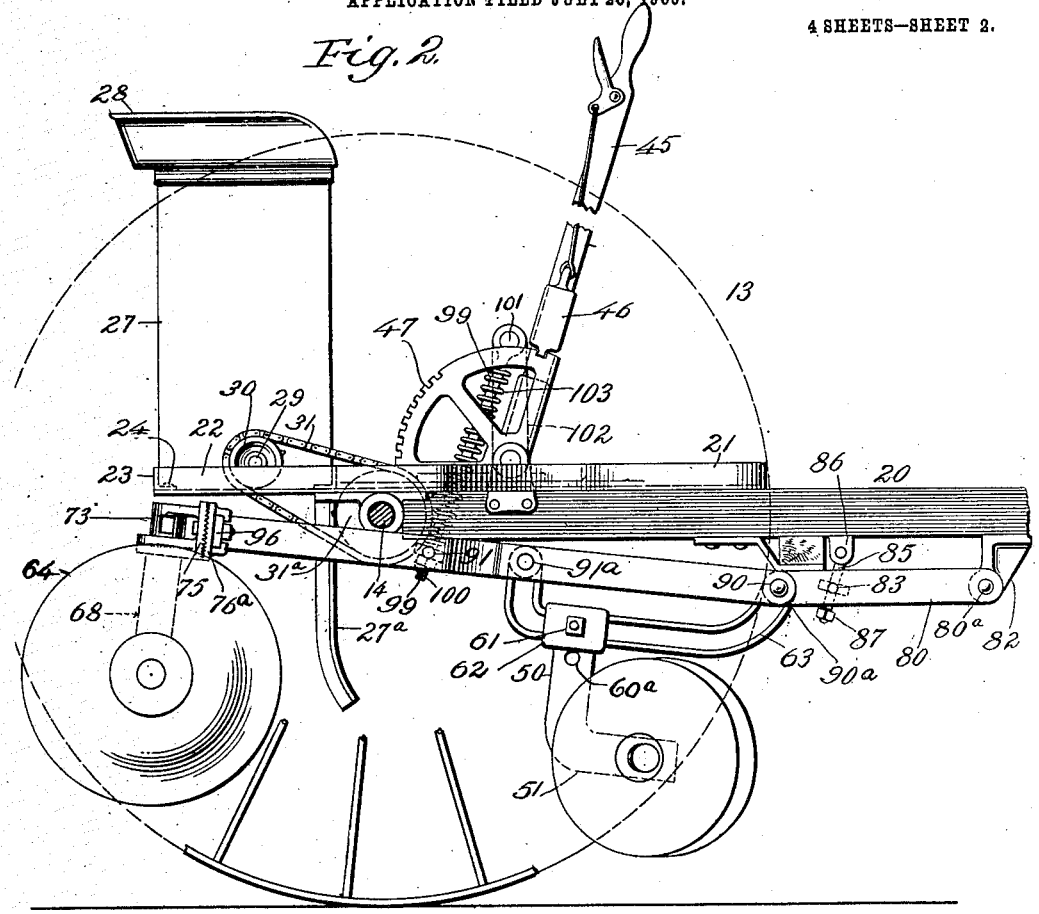
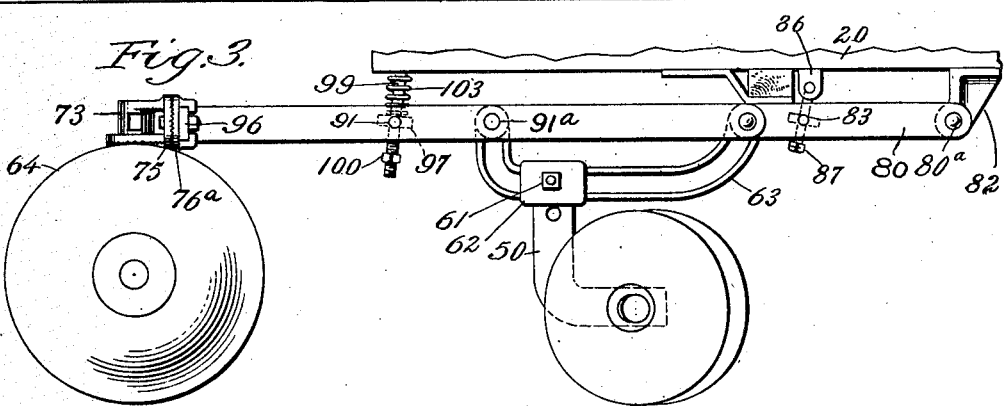
Witnesses
Inventors
William C. Lynham
William D. Crews No. 860,399. PATENTED JULY 16, 1907.
W. C. LYNHAM & W. D. CREWS.
COMBINED FURROW OPENER, FERTILIZER DISTRIBUTER, LISTER,
AND BEDDER.
APPLICATION FILED JULY 20, 1906.
4 SHEETS—SHEET 3.
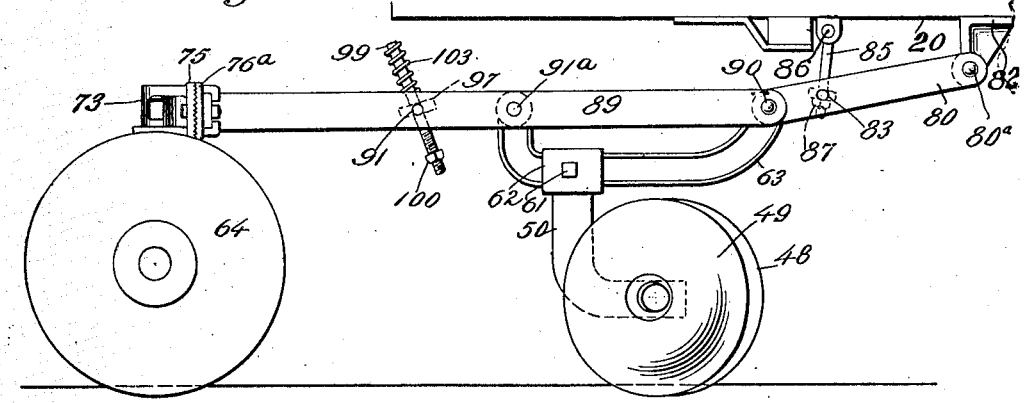
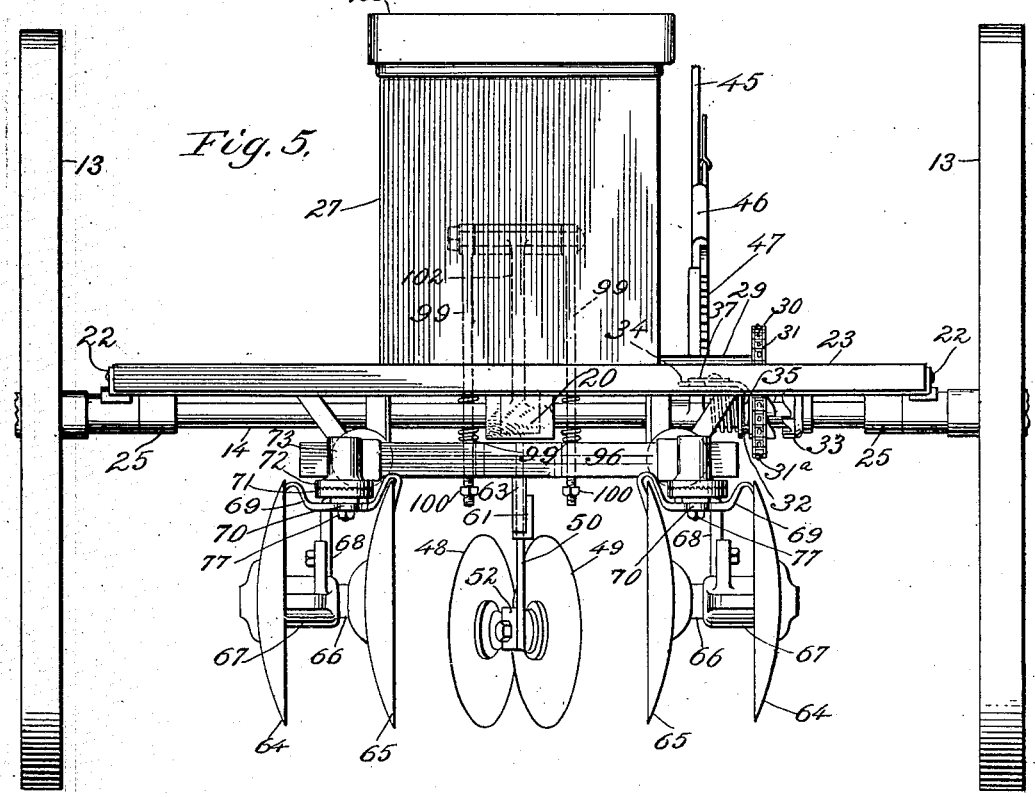
Witnesses
Inventors
William C. Lynham
William D. Crews
By Meyers, Cushman
their Attorneys No. 860,399. PATENTED JULY 16, 1907.
W. C. LYNHAM & W. D. CREWS.
COMBINED FURROW OPENER, FERTILIZER DISTRIBUTER, LISTER,
AND BEDDER.
APPLICATION FILED JULY 20, 1906.
4 SHEETS—SHEET 4.
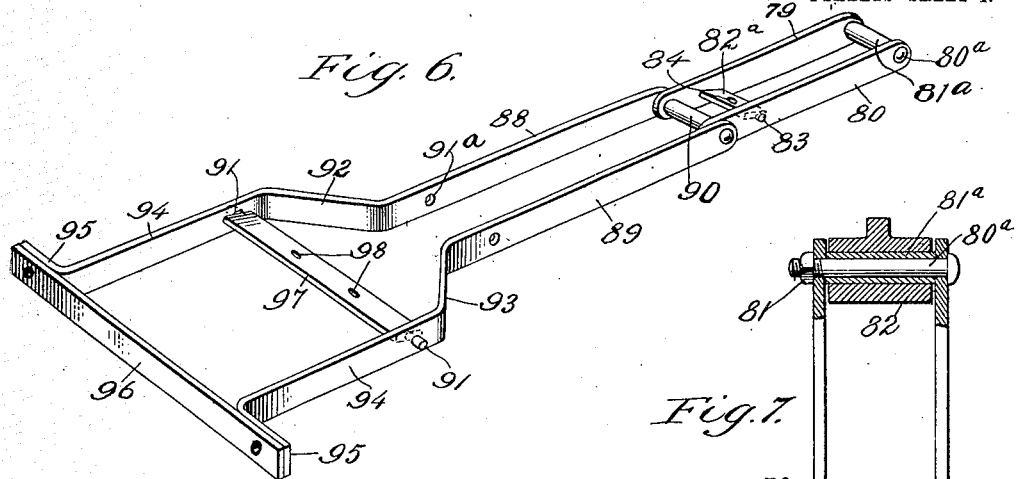
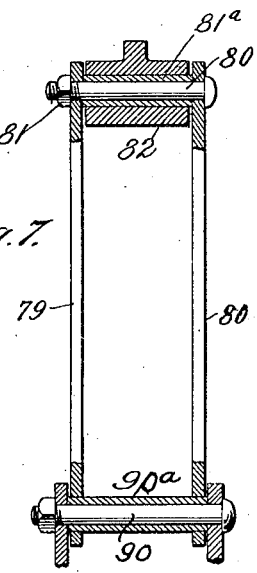
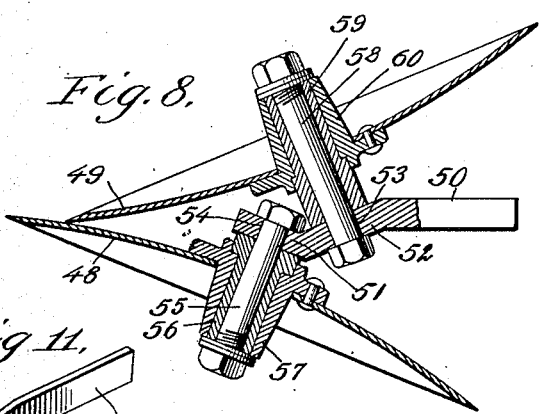
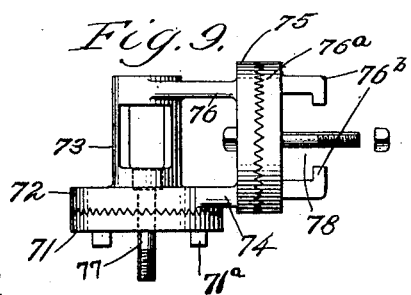
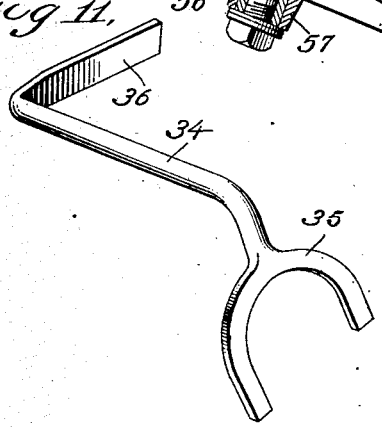
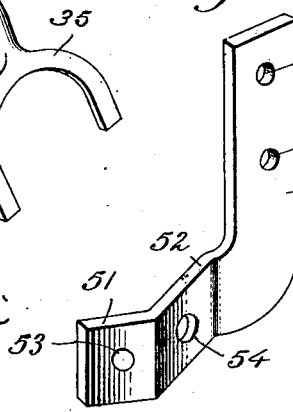
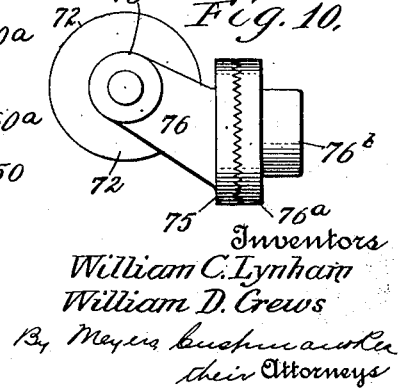
Witnesses
Inventors
William C. Lynham
William D. Crews
By Meyers Cushman & Co.
their Attorneys

UNITED STATES PATENT OFFICE.

WILLIAM C. LYNHAM, OF RICHMOND, AND WILLIAM D. CREWS, OF CONCORD STATION, VIRGINIA.

COMBINED FURROW-OPENER, FERTILIZER-DISTRIBUTER, LISTER, AND BEDDER.

No. 860,399.      Specification of Letters Patent.      Patented July 16, 1907.

Application filed July 20, 1906. Serial No. 327,061.

*To all whom it may concern:*

Be it known that we, WILLIAM C. LYNHAM and WILLIAM D. CREWS, citizens of the United States, residing, respectively, at Richmond and Concord Station, in the counties of Henrico and Campbell and State of Virginia, have invented new and useful Improvements in a Combined Furrow-Opener, Fertilizer-Distributer, Lister, and Bedder, of which the following is a specification.

This invention relates to a combined furrow opener, fertilizer-distributer, lister and bedder of that class having means for making a furrow preliminary to receiving the fertilizer and aims to provide means in a manner as hereinafter set forth for yieldingly supporting the furrow openers and covering disks or bedders thereby preventing injury thereto if they should meet with an obstruction.

The invention further aims to provide an agricultural machine of such class with forwardly positioned furrow openers and rearwardly positioned covering disks, and further with a shiftable yielding means common to the furrow openers and covering disks for moving the furrow openers and covering disks to operative position and in such manner that the furrow openers will not engage the ground in advance of the covering disks.

The invention further aims to provide the machine with a duplex adjusting device for the rearwardly positioned covering disks, said device permitting of the listers being adjusted in an angular manner with respect to a longitudinal and a transverse line extending through the machine.

The invention further aims to provide the machine with a pair of forwardly arranged furrow openers, so positioned that one of said furrow openers will intersect the cutting line of the other of the said furrow openers for a purpose as hereinafter set forth.

The invention further aims to provide a machine of such class with means as hereinafter set forth for automatically discontinuing the discharge of fertilizer when the furrow openers are moved to inoperative position.

The invention further aims to provide an agricultural machine of the class referred to which shall be simple in its construction, strong, durable, efficient in its use, provided with means to prevent injury to the furrow openers when the latter meet an obstruction, readily set up, conveniently operated and comparatively inexpensive to manufacture.

With the foregoing and other objects in view the invention consists of the novel construction, combination and arrangement of parts hereinafter more specially referred to and illustrated in the accompanying drawings wherein is shown the preferred embodiment of the invention, but it is to be understood that changes, variations and modifications may be resorted to which come within the scope of the claims hereunto appended.

In describing the invention in detail reference is had to the accompanying drawings wherein like reference characters denote corresponding parts throughout the several views, and in which:

Figure 1 is a top plan view of a fertilizer-distributer in accordance with the invention. Fig. 2 is a side elevation showing the inoperative position of the furrow openers and covering disks. Fig. 3 is a detail showing one position of the furrow openers and covering disks while being adjusted. Fig. 4 is a like view showing the position of the furrow openers and covering disks in operative position. Fig. 5 is an end view of the machine from the rear. Fig. 6 is a detail of the shifting means for the furrow openers and covering disks. Fig. 7 is a detail of a part of the means for adjustably moving the furrow openers and covering disks. Fig. 8 is a sectional plan of the front furrow openers. Figs. 9 and 10 are respectively a side and top plan of the adjustable duplex bearing for the covering disks. Fig. 11 is a detail showing the clutch shifting lever, and Fig. 12 is a detail showing the hanger for the front furrow openers.

Referring to the drawing by reference characters 13 denotes the wheels of the machine, 14 the body of the axle, and 15, 15$^a$ the axle spindles upon which are mounted the wheels 13 and which are somewhat elongated to permit of laterally adjusting the wheels 13 to increase and decrease the width of the machine when occasion so requires. One wheel 13 is secured upon a spindle 15 by a suitable pin passing through an opening 17 in one end of its hub 16 and through an alining opening 18 in said spindle 15. One wheel 13 is rigidly secured to a spindle while the other wheel is loosely mounted upon the other spindle in any well known manner.

The machine frame is mounted upon the axle body 14, the latter passing through the sides of the frame and the frame at its forward end is supported upon and secured to the tongue or beam 20. The machine frame comprises two members one of which is angular in cross section and formed with a V-shaped portion 21 terminating in a pair of rearwardly extending portions 22. The other of said members consists of a transversely extending angle iron 23 having its ends secured to the ends of the rearwardly extending portions 22 of the other member as at 24. The V-shaped portion 21 and the rearwardly extending portions 22 constitutes respectively the front and sides of the machine frame while the member 23 constitutes the back of the frame. The axle body 14 is provided with stop collars 25 to prevent the lateral shifting of the frame upon the axle body. Secured to the sides of the frame intermediate the ends thereof is a transversely extended brace member 26 for the frame, the said member 26 also constituting in connection with the machine frame a support for the fertilizer supply box or receptacle 27 which may be of any suitable construction and upon the top of the box 27 is mounted a seat 28 for the driver. The box 27 is provided with the discharge tubes 27ᵃ.

The means for operating the outlet valve or slide (not shown) of the fertilizer supply box 27 for causing a discharge of fertilizer comprises a short shaft 29 operatively connected at one end in any suitable manner to the outlet valve or slide and at its other end is provided with a sprocket pinion 30 over which travels a transmission chain 31, the latter also traveling over a sprocket wheel 31ᵃ carried by a shiftable clutch member 32 loosely mounted upon the axle body 14 to be moved into clutching engagement with the fixed member 33 fast to the axle body 14. The clutch member 32 is shiftably moved from clutching position with respect to the member 33 by a shifting arm 34 having a forked end 35 (Fig. 11) which straddles said member 32. The other end of the arm 34 is bent at an angle with respect to the body of the arm as at 36, and the said angularly extending end 36 is engaged and operated by one arm of a bell crank lever 37, which is pivoted as at 38 to a longitudinally extending supporting bar 39, secured at its ends, respectively, to the V-shaped portion 21 of the machine frame and member 26. The bell crank lever 37 is shifted in one direction by a flexible member 40, connected at one end to the other arm of the bell crank lever 37 and at its other end to a collar 41, fast to a rock shaft 42, which is journaled at one end in a bearing 43 carried by the V-shaped portion 21 of the machine frame and at its other end in a bearing 44 secured to the bar 39. The action of the bell crank lever 37, in one direction when shifting the clutch member 32, is against the action of a spring, which bears against the said member 32, and the function of the said spring is to cause the member 32 to move into clutching engagement with the clutch member 33, and also to move the bell crank 37 to normal position when the flexible member 40 is released after being moved in one direction to shift the bell crank lever 37 to move the clutch members 32 out of clutching engagement with the member 33. The rock shaft 42 is operated through the medium of a hand lever 45 fixed at its lower end to the collar 41. The shaft 42 as well as the lever 45 is arranged forward of the seat 28 and the said lever 45 is so positioned as to be in convenient reach of the driver. The lever 45 is provided with the usual spring actuated pawl 46 engaging in the teeth of a segmental shaped rack 47 secured to the bar 39 at one side of the lever 45.

The machine is provided with a forward pair of furrow openers and two pairs of rearwardly positioned covering disks or bedders. The said pairs of furrow openers being adjustable so as to regulate the depth of the furrow and the direction in which the furrow openers and covering disks extend. The furrow openers and covering disks are shown in the form of concave-convex disks but any suitable form of furrow openers or covering disks may be employed.

The disks of the front pair of furrow openers are indicated by the reference characters 48 and 49, the disk 48 being arranged forwardly of the disk 49, so that the cutting edge of the latter will intersect the cutting line of the former. (See Fig. 8). By such an arrangement if the disk 48, should strike an obstruction it will ride over or to one side thereof in advance of the disk 49, preventing any damage to the latter. The disks 48 and 49 are journaled in the lower end of an L-shaped hanger arm 50 (Fig. 8 & 12). The said arm 50 has its lower portion bent at an angle as 51 with respect to the body portion thereof and further bent at an angle as at 52 with respect to the portion 51. The inclination of the portion 52 being greater than the portion 51. The portions 51 and 52 are provided with openings 53 and 54. Mounted in the opening 53 is a headed bolt 55 which extends at an inclination and carries a shouldered bearing sleeve 56 and journaled upon the sleeve 56 is the hub 57 of the disk 48. Mounted in the opening 54 is a headed bolt 58 which extends at an inclination and in a direction opposite with respect to the direction in which the bolt 55 extends and the said bolt 58 carries a shouldered bearing sleeve 59 and journaled upon the sleeve 59 is the hub 60 of the disk 49. The bolt 58 is of greater length than the bolt 55 and the inclination of said bolt 58 is greater than the inclination of the bolt 55. By setting up the disks 48 and 49 in the manner set forth the disk 49 is positioned rearwardly of the disk 48 so that the cutting edge of the disk 49 is caused to intersect the cutting line of the disk 48, furthermore the position of the disks 48 and 49 will be such as to cause each to extend at an inclination, but the direction in which one disk will extend will be opposite with respect to the direction in which the other disk will extend. The body portion of the hanger arm 50 is provided with a plurality of openings 60ᵃ to permit of adjustably connecting the said arm 50, by the holdfast device 61, to a longitudinally adjustable clamp 62 carried by the supporting bracket 63, which is secured to the means for adjustably moving the forward and rear furrow openers to operative positions. The holdfast device 61 not only constitutes a means for connecting the arm 50 to the clamp 62 but also acts as a means for securing the clamp 62 to the bracket 63.

Each pair of the rearwardly positioned covering disks or bedders consists of two concavo-convex disks 64 and 65, mounted upon a shaft 66, the latter being journaled in a bearing 67 carried by a hanger 68, the latter being attached to a duplex adjusting device for the furrow openers. The hanger has its upper portion bent over at right angles, and arranged to lie between the lugs, 71ᵃ, Fig. 9. The bolt 77 then passes through this bent over end and the adjusting means, and secures the parts firmly in place. Arranged at the rear of the adjusting device is a scraper 69 having an ear 70. The said device consists of a toothed member 71 adapted to engage a toothed member 72 having an upwardly extending sleeve 73. The toothed member 72 is connected by an arm 74, to an adjustable toothed member 75, and the sleeve 73 is connected to the toothed member 75 by an arm 76. The toothed member 75 is adapted to engage a toothed member 76ᵃ provided with a pair of L-shaped connecting arms 76ᵇ for attaching the member 76 to the means for adjustably moving the furrow openers to operative position. Extending through the ear 70, toothed members 71, 72 and a sleeve 73 is a holdfast means 77 in the form of a bolt and nut for securing the elements 69, 72 and 73 together and for securing the member 71 in its adjusted position. Extending through the members 75 and 76 is a holdfast means 78 in the form of a bolt and nut for securing the members 75 and 76 together and for securing the member 75 in its adjusted position. The bolt which forms one element of the holdfast means 77 constitutes a vertical axis upon which the member 71 can be adjusted, thereby enabling the pair of disks 64 and 65 to be adjusted in unison at an inclination, with respect, to a longitudinal line through the frame of the machine. The bolt which forms one element of the holdfast means 78 constitutes a longitudinally extended axis upon which the member 75 can be adjusted thereby enabling the pair of disks 64 and 65 to be adjusted in unison, at an inclination, with respect to a transverse line through the frame of the machine. The holdfast device 78 also constitutes means for securing the duplex adjusting device to the means for adjustably moving the covering disks to operative position.

A shifting means for adjustably moving the furrow openers and covering disks to operative position consists of a pair of links 79—80, which are connected together at their forward ends by a bolt 80$^a$ and nut 81, the former extending through a sleeve 81$^a$ mounted on a bracket 82 depending from the lower face of the tongue 20. The sleeve 81$^a$ is of greater length than the bracket 82 and abuts against the inner face of the links 79 and 80 consequently preventing lateral motion of the links separately. Intermediate the ends of the links 79, 80 and between the said links 79 and 80 a bar 82$^a$ is positioned having the ends thereof secured in the links 79 and 80 as at 83. The bar 82$^a$ is provided with an opening 84 through which plays a stop arm 85 pivotally connected at its upper end in a pair of ears 86, and has its lower end screw threaded to receive a stop nut 87. The nut 87 being adjustable upon the arm 85 also enables the regulating the limit of the lowering of the links 79 and 80. These latter are pivotally connected at their rear ends to a pair of rearwardly extending supporting arms 88 and 89. To these arms 88, 89 are connected as at 91$^a$ one end of the bracket 63 while the other end of the bracket 63 is attached to the pivotal connection 90 between the links 79, 80 and supporting arms 88, 89. These latter have a portion thereof as at 92 and 93 projecting outwardly at an angle, the portion 92 extending in an opposite direction with respect to the portion 93.
The angular projecting portions 92 and 93 terminate in rearwardly extending portions 94, which terminate in right angularly extending portions 95, to which are attached the connecting bar 96. By setting up the supporting arms in such manner the rear portions thereof spread outwardly thereby extending at each side of, but below the fertilizer supply box 27. The right angularly extending portions 95 and connecting bar 96 are engaged by the connecting arms 76$^b$ of the duplex adjusting devices for the furrow openers and the said devices are connected to the portions 95 and bar 96 by the holdfast device 78. Journaled in and arranged between the rearwardly extending portions 94 of the supporting arms 88 and 89 is a rock bar 97, having a pair of openings 98 for a function to be presently referred to. By setting up a means for adjustably moving the furrow openers in a manner as set forth it prevents when the said means is adjusted the front furrow openers from assuming an operative position in advance of the covering disks. In this connection it will be seen that when lever 45 is released, covering disks 64 and 65 being heavier than the openers, 48, 49, and also being at a greater distance from the rod 99, will, acting about the point 91 as a pivot, serve to hold the joint 90, up against the under side of the machine frame. Now, as the lever 45 is released, and moved backward, the members 88, 89 swing about 90 as a pivot, thus lowering the covering disks, but the pivot 90 and openers 48, 49 will be held in the elevated position, due to the above described counterbalancing effect of the disks 64, 65. When, however, these disks touch the ground, the disks 48, 49, no longer being counter-balanced, immediately fall, flexing the joint 90, and bringing the parts into the final position shown in Fig. 4. When it is desired to move the disks to inoperative position, the lever 45 is pushed forwardly and the rod 99, pulling upwardly on the members 88, 89, at the pivot 91, causes the openers 48, 49 to rise first, because they are lighter than the coverers 64, 65, and these latter will not begin to rise till the joint 90 comes in contact with the frame of the machine, and thus forms a fulcrum 64, 65, and members 88, 89 may turn.

The means for shifting the furrow openers and covering disks to operative position is operated through the medium of a cushioning or yielding device, acting as a means to yieldingly support the furrow openers, so as to cause the furrow openers to yield when striking or coming against an obstruction thereby preventing injury to the furrow openers. The said cushioning yielding device consists of a pair of inclined rods 99 extending through the openings 98 in the rock bar 97 and carrying lifting nuts 100 on their lower ends. The rods 99 have their upper ends provided with openings through which extends a bolt 101, which extends through the hollow upper end of a rearwardly inclined T-shaped arm 102 carried by the rod shaft 42 and said bolt 101 swivelly, connects the rods 99 to said arm 102. Surrounding each of the rods 99 and interposed between the bar 97 and upper end of arm 102 is a coiled compression spring 103. From the foregoing construction it will be evident that when the lever 45 is moved towards the driver, the shaft 42 will rock rearwardly imparting a rearward and downward movement to the rods 99 which will tend to compress the springs 103, these latter bearing against the bar 97, will lower the arms 88 and 89 and cause the said arms 88, 89 and the links 79, 80 to assume the position shown in Fig. 4 thereby moving the furrow openers and covering disks to operative position, then if the pawl 46 is moved to engage between a pair of the teeth of the rack 47, the furrow openers will be retained in such position under a yielding pressure owing to the interposition of the springs 103, between the bar 97 and arm 102. Therefore it will be evident, that if the furrow openers and covering disks meet with an obstruction, the said openers and covering disks will yield consequently preventing injury thereto. When it is desired to elevate the furrow openers and covering disks, the lever 45 is released, moved in an opposite direction, the shaft 42 will then be moved in a corresponding direction, allowing the springs to expand, the lifting nuts 100 will then engage the bar 97 and lift the arms 88 and 89 to normal position or in other words cause the said shifting means to assume the position shown in Fig. 2.

The lever 45, the shifting means for adjustably moving the furrow openers and covering disks, and the operating means for the latter are used at the ends of the furrows to lift the furrow openers and covering disks free from the ground while turning the machine around to prevent strain to the machine, and also to operate the flexible connection 40 to throw the clutching member 32 out of engagement with the clutching member 33 so as to stop the discharge of the fertilizer.

While we have shown the duplex adjusting devices and the hanger 50 carrying concavo-convex disks constituting furrow openers, it will be evident that any suitable form of ground working tool can be utilized. It will also be understood that by selecting different notches in the rack 47 the furrow openers may be set to work at any desired depth.

Instead of the construction described and shown any other suitable construction permitting a similar adjustment of the links 79, 80 may be employed.

Having thus fully described the invention what we claim and desire to secure by Letters Patent is:

1. A machine of the class described comprising a pair of supporting arms, a pair of links pivoted to the forward end thereof and connected with the frame of the machine, means for limiting the downward movement of said links, a pair of forward ground working tools carried by said arms near said pivot, a pair of rearward ground working tools heavier than the forward tools carried at the other end of said arms, and an operating rod pivoted to said arms intermediate the pairs of tools, the arrangement being such that the rear tools, acting about the last named pivot, overbalance the forward tools, and hence descend first, when said tools are lowered, and rise last, when said tools are raised.

2. A machine of the character described comprising a pair of supporting arms, a pair of shiftable links pivotally connected at one end with the machine body and at the other end pivotally connected to the forward end of said arms, ground working tools adjustably connected to the rear of said arms, furrow openers adjustably connected to said arms on the forward part thereof, means for shiftably and yieldably connecting the rear of said arms with the machine body, and means for adjustably limiting the shifting movement of said links.

3. A machine of the character described comprising a pair of supporting arms, a pair of shiftable links pivotally connected at one end with the machine body and at the other end pivotally connected to the forward end of said arms, ground working tools connected to the rear of said arms, furrow openers connected to the said arms on the forward part thereof, means for shiftably and yieldably connecting the rear of said arms to the machine body, and means for adjustably limiting the shifting movement of said links.

4. A machine of the character described comprising a pair of supporting arms, a pair of shiftable links pivotally connected at one end with the machine body and at the other end pivotally connected to the forward end of said arms, ground working tools adjustably connected to the rear of said arms, furrow openers adjustably connected to said arms on the forward part thereof, a rock bar carried by said arms, a rock shaft, a rearwardly inclined arm fixed thereto, a pair of depending rods connected at one end to said arm and at the other end extending through said rock bar, springs mounted upon the rods and interposed between the rock bar and arm, lifting nuts carried by the rods, and a lever for actuating said shaft.

5. A machine of the character described comprising a pair of supporting arms, a pair of shiftable links pivotally connected at one end with the machine body and at the other end pivotally connected to the forward end of said arms, ground working tools connected to the rear of said arms, furrow openers connected to the said arms on the forward part thereof, a rock bar carried by said arms, a rock shaft, a rearwardly inclined arm fixed thereto, a pair of depending rods connected at one end to said arm and at the other end extending through said rock bar, springs mounted upon the rods and interposed between the rock bar and arm, lifting nuts carried by the rods and a lever for actuating said shaft.

6. A machine of the character described comprising a pair of supporting arms, means for pivotally connecting the forward end of said arms with the machine body, two pairs of rearwardly positioned ground working tools, duplex adjusting means for connecting each pair of ground working tools to the rear end of said arms, a pair of forward furrow openers, a rock bar carried by said arms, a rock shaft, an inclined arm fixed thereto, a pair of depending rods connected at one end to said arm and at the other end extending through said rock bar, springs mounted upon the rods and interposed between the rock bar and arm, lifting nuts carried by the rods and a lever for actuating said shaft.

7. A machine of the character described comprising a pair of supporting arms, a pair of shiftable links pivotally connected at one end with the machine body and at the other end pivotally connected to the forward end of said arms, ground working tools adjustably connected to the rear of said arms, furrow openers adjustably connected to said arms on the forward part thereof, a rock bar carried by said arms, a rock shaft, an inclined arm fixed thereto, a pair of depending rods connected at one end to said arm and at the other end extending through said rock bar, springs mounted upon the rods and interposed between the rock bar and arm, lifting nuts carried by the rods, a lever for actuating said shaft, and means for adjustably limiting the shifting movement of said links.

8. A machine of the character described comprising a pair of supporting arms, a pair of shiftable links pivotally connected at one end with the machine body and at the other end pivotally connected to the forward end of said arms, ground working tools connected to the rear of said arms, furrow openers connected to said arms on the forward part thereof, a rock bar carried by said arms, a rock shaft, an inclined arm fixed thereto, a pair of depending rods connected to one end of said arm and at the other end extending through said rock bar, springs mounted upon the rods and interposed between the rock bar and arm, lifting nuts carried by the rod, a lever for actuating said shaft, and means for adjustably limiting the shifting movement of said links.

9. A machine of the class described, comprising a pair of supporting arms, a pair of openers carried at one end thereof, a pair of coverers carried at the other end thereof, and means controlled by a single lever for moving said parts into operative position, the coverers being the first to reach operative position and the last to leave it.

10. A machine of the class described, comprising a pair of supporting arms, a pair of links pivoted to the forward end thereof and connected with the frame of the machine, a pair of forward ground working tools carried by said arms near said pivot, a pair of rear ground working tools carried at the other end of said arms, and an operating rod pivoted to said arms intermediate the pairs of tools, the arrangement being such that the rear tools, acting about the last named pivot, overbalance the forward tools, and hence descend first, when said tools are lowered, and rise last, when said tools are raised.

11. In a machine of the class described, a pair of forward ground working tools, a pair of rear ground working tools, a common supporting member carrying said tools, and lifting means pivoted to said member intermediate said pairs of tools, the arrangement being such that the rear tools acting about the pivot, overbalance the forward tools during the raising and lowering of said member.

In testimony whereof we have hereunto set our hands in presence of two subscribing witnesses.

WILLIAM C. LYNHAM.
WILLIAM D. CREWS.

Witnesses:
K. OTEY, Jr.,
JAMES A. SCOTT.